(12) United States Patent
Fujiya et al.

(10) Patent No.: US 11,445,095 B2
(45) Date of Patent: Sep. 13, 2022

(54) IMAGE-SENSOR FIXING STRUCTURE

(71) Applicant: RICOH COMPANY, LTD., Tokyo (JP)

(72) Inventors: Takaaki Fujiya, Tokyo (JP); Yuji Toriumi, Tokyo (JP); Makoto Iikawa, Tokyo (JP); Hiroyuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 100 days.

(21) Appl. No.: 16/981,053

(22) PCT Filed: Mar. 7, 2019

(86) PCT No.: PCT/JP2019/009062
§ 371 (c)(1),
(2) Date: Sep. 15, 2020

(87) PCT Pub. No.: WO2019/181533
PCT Pub. Date: Sep. 26, 2019

(65) Prior Publication Data
US 2021/0006694 A1   Jan. 7, 2021

(30) Foreign Application Priority Data

Mar. 20, 2018 (JP) .............................. JP2018-052386

(51) Int. Cl.
*H04N 5/225* (2006.01)
*G02B 7/18* (2021.01)

(52) U.S. Cl.
CPC ......... *H04N 5/2254* (2013.01); *G02B 7/1805* (2013.01)

(58) Field of Classification Search
CPC ........ G02B 7/18; G02B 7/1805; G03B 19/02; H04N 5/225; H04N 5/2254
See application file for complete search history.

(56) References Cited

U.S. PATENT DOCUMENTS

| | | | |
|---|---|---|---|
| 5,884,110 | A | 3/1999 | Iikawa et al. |
| 5,969,889 | A | 10/1999 | Iikawa et al. |
| 6,118,601 | A | 9/2000 | Iikawa et al. |

(Continued)

FOREIGN PATENT DOCUMENTS

| | | | |
|---|---|---|---|
| CN | 103685886 A | | 3/2014 |
| CN | 105120177 A | | 12/2015 |

(Continued)

OTHER PUBLICATIONS

Office Action dated Oct. 9, 2021 in Chinese Patent Application No. 201980019688.9, 6 pages.

(Continued)

*Primary Examiner* — Amy R Hsu
(74) *Attorney, Agent, or Firm* — Xsensus LLP

(57) ABSTRACT

An image-sensor fixing structure includes an imaging optical system; and an image sensor configured to receive light of an image formed by the imaging optical system. The image sensor has an imaging surface includes an effective region, in which light of an image formed by the imaging optical system is received, and a peripheral region outside the effective region. A body member holding the imaging optical system is fixed to the peripheral region.

7 Claims, 10 Drawing Sheets

(56) References Cited

U.S. PATENT DOCUMENTS

| | | |
|---|---|---|
| 6,178,295 B1 | 1/2001 | Nakata et al. |
| 6,236,523 B1 | 5/2001 | Iikawa et al. |
| 6,269,227 B1 | 7/2001 | Hamasaki et al. |
| 6,333,825 B1 | 12/2001 | Hamasaki et al. |
| 2001/0009071 A1 | 7/2001 | Iikawa et al. |
| 2002/0012539 A1 | 1/2002 | Sato et al. |
| 2002/0020937 A1 | 2/2002 | Iikawa et al. |
| 2002/0080049 A1 | 6/2002 | Iikawa et al. |
| 2002/0105731 A1 | 8/2002 | Iikawa et al. |
| 2002/0114087 A1 | 8/2002 | Iikawa et al. |
| 2004/0012862 A1 | 1/2004 | Iikawa |
| 2004/0061958 A1 | 4/2004 | Kobayashi et al. |
| 2004/0090681 A1 | 5/2004 | Iikawa et al. |
| 2004/0090682 A1 | 5/2004 | Iikawa |
| 2004/0136090 A1 | 7/2004 | Iikawa et al. |
| 2004/0136777 A1 | 7/2004 | Iikawa et al. |
| 2005/0072646 A1 | 4/2005 | Hamasaki et al. |
| 2005/0087416 A1 | 4/2005 | Iikawa et al. |
| 2005/0094992 A1 | 5/2005 | Hamasaki et al. |
| 2005/0115358 A1 | 6/2005 | Hamasaki et al. |
| 2006/0104624 A1 | 5/2006 | Nakata et al. |
| 2007/0002468 A1 | 1/2007 | Iikawa et al. |
| 2007/0258155 A1 | 11/2007 | Shimizu et al. |
| 2008/0044175 A1 | 2/2008 | Iikawa |
| 2008/0075454 A1 | 3/2008 | Iikawa |
| 2008/0204878 A1 | 8/2008 | Iikawa et al. |
| 2008/0259472 A1 | 10/2008 | Iikawa |
| 2010/0214679 A1 | 8/2010 | Iikawa et al. |
| 2011/0181768 A1* | 7/2011 | Nomura .................. G03B 17/00 348/340 |
| 2012/0075720 A1 | 3/2012 | Iikawa et al. |
| 2012/0075731 A1 | 3/2012 | Iikawa et al. |
| 2013/0050405 A1 | 2/2013 | Masuda et al. |
| 2013/0050408 A1 | 2/2013 | Masuda et al. |
| 2013/0057542 A1 | 3/2013 | Takenaka et al. |
| 2013/0063754 A1 | 3/2013 | Saisho et al. |
| 2013/0235149 A1 | 9/2013 | Tanaka et al. |
| 2013/0242040 A1 | 9/2013 | Masuda et al. |
| 2013/0326419 A1 | 12/2013 | Harada et al. |
| 2014/0036031 A1 | 2/2014 | Tanaka et al. |
| 2014/0071226 A1 | 3/2014 | Satoh et al. |
| 2014/0071227 A1 | 3/2014 | Takenaka et al. |
| 2014/0078247 A1 | 3/2014 | Shohara et al. |
| 2014/0086568 A1* | 3/2014 | Nomura ............... G02B 27/646 396/55 |
| 2014/0111686 A1 | 4/2014 | Iikawa et al. |
| 2014/0119720 A1 | 5/2014 | Iikawa et al. |
| 2014/0119721 A1 | 5/2014 | Iikawa et al. |
| 2014/0132709 A1 | 5/2014 | Satoh et al. |
| 2014/0152852 A1 | 6/2014 | Ito et al. |
| 2014/0176542 A1 | 6/2014 | Shohara et al. |
| 2015/0015664 A1 | 1/2015 | Masuda et al. |
| 2015/0015766 A1 | 1/2015 | Satoh et al. |
| 2015/0042647 A1 | 2/2015 | Shohara et al. |
| 2015/0062363 A1 | 3/2015 | Takenaka et al. |
| 2015/0192762 A1 | 7/2015 | Satoh et al. |
| 2015/0222816 A1 | 8/2015 | Shohara et al. |
| 2015/0301316 A1 | 10/2015 | Masuda et al. |
| 2016/0006907 A1 | 1/2016 | Masuda et al. |
| 2016/0116758 A1 | 4/2016 | Nomura et al. |
| 2016/0147045 A1 | 5/2016 | Masuda et al. |
| 2016/0182825 A1 | 6/2016 | Tanaka et al. |
| 2016/0266359 A1 | 9/2016 | Amano et al. |
| 2016/0313541 A1 | 10/2016 | Satoh et al. |
| 2016/0337561 A1* | 11/2016 | Park .................. H01L 31/0203 |
| 2016/0337584 A1 | 11/2016 | Masuda et al. |
| 2016/0353020 A1 | 12/2016 | Satoh |
| 2017/0116704 A1 | 4/2017 | Takenaka et al. |
| 2017/0270381 A1 | 9/2017 | Itoh et al. |
| 2017/0310895 A1 | 10/2017 | Masuda et al. |
| 2017/0315336 A1 | 11/2017 | Masuda et al. |
| 2018/0024333 A1 | 1/2018 | Satoh et al. |
| 2018/0191956 A1* | 7/2018 | Nomura ............... H04N 5/2253 |
| 2018/0213152 A1 | 7/2018 | Masuda et al. |
| 2018/0278815 A1 | 9/2018 | Park et al. |
| 2019/0219789 A1* | 7/2019 | Mogi .................. G02B 27/0075 |

FOREIGN PATENT DOCUMENTS

| | | |
|---|---|---|
| CN | 106158894 A | 11/2016 |
| JP | 2007-049369 | 2/2007 |
| JP | 2013-021417 | 1/2013 |
| JP | 2016-007374 A | 1/2016 |
| JP | 2016-118742 A | 6/2016 |

OTHER PUBLICATIONS

International Search Report and Written Opinion dated May 20, 2019 in PCT/JP2019/009062 filed on Mar. 7, 2019.
Office Action dated Jan. 5, 2022 in Japanese Patent Application No. 2018-052386, 3 pages.

* cited by examiner

IMAGE-SENSOR FIXING STRUCTURE

TECHNICAL FIELD

Embodiments of the present disclosure relate to a fixing structure for an image sensor to be mounted on an imaging apparatus.

BACKGROUND ART

In recent imaging apparatuses, progress has been made in terms of size reduction of the apparatuses and increased resolution of pick-up images. Consequently, positional accuracy of image sensors with respect to an imaging optical system greatly influences optical performance. Image sensors are thus required to be accurately positioned with respect to an imaging optical system and held.

Image sensors are fixed to a body member holding an imaging optical system. Typically, when a substrate supporting an image sensor is larger than the image sensor, a holding member is fixed to a region of the substrate around the image sensor. As a technology that differs from such an existing fixing structure, a technology for disposing a holding member at an outer peripheral portion of an image sensor and bonding the holding member to the outer peripheral portion has been proposed (PTL 1).

CITATION LIST

Patent Literature

PTL 1: JP-5754271-B

SUMMARY OF INVENTION

Technical Problem

In the fixing structure in PTL 1, thickness perpendicular to an imaging surface is reduced but a size reduction in a direction along the imaging surface is limited because the holding member is disposed outside the outline of the image sensor.

The embodiments of the present disclosure were developed on the basis of awareness of the aforementioned problem, and an object of the present invention is to provide an image-sensor fixing structure capable of holding an image sensor while saving space in a direction along an imaging surface.

Solution to Problem

The embodiments of the present disclosure include an imaging optical system, and an image sensor configured to receive light of an image formed by the imaging optical system, in which the image sensor has an imaging surface including an effective region, in which light of an image formed by the imaging optical system is received, and a peripheral region outside the effective region, and in which a body member holding the imaging optical system is fixed to the peripheral region.

Advantageous Effects of Invention

According to an embodiment of the present disclosure, as a result of using the peripheral region outside the effective region, in which light of an image formed by the imaging optical system is received, of the imaging surface of the image sensor to fix the body member, it is possible to hold the image sensor with a structure that saves space in a direction along the imaging surface.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
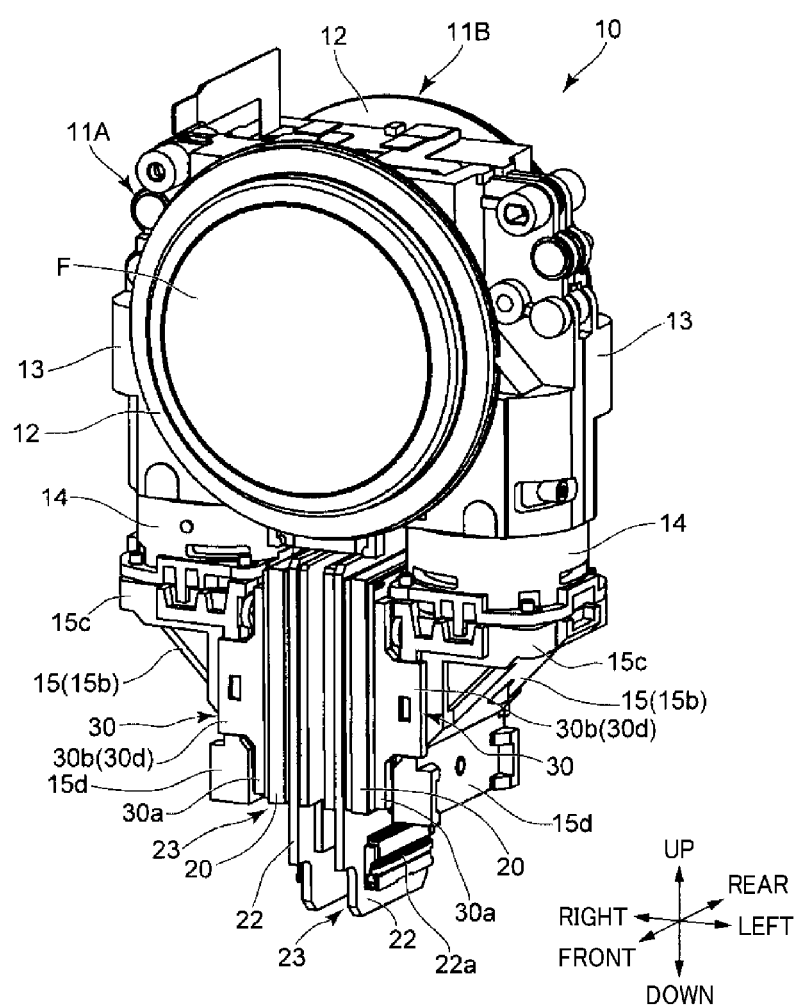
FIG. 1 is a perspective view of an imaging apparatus according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Figure 2:
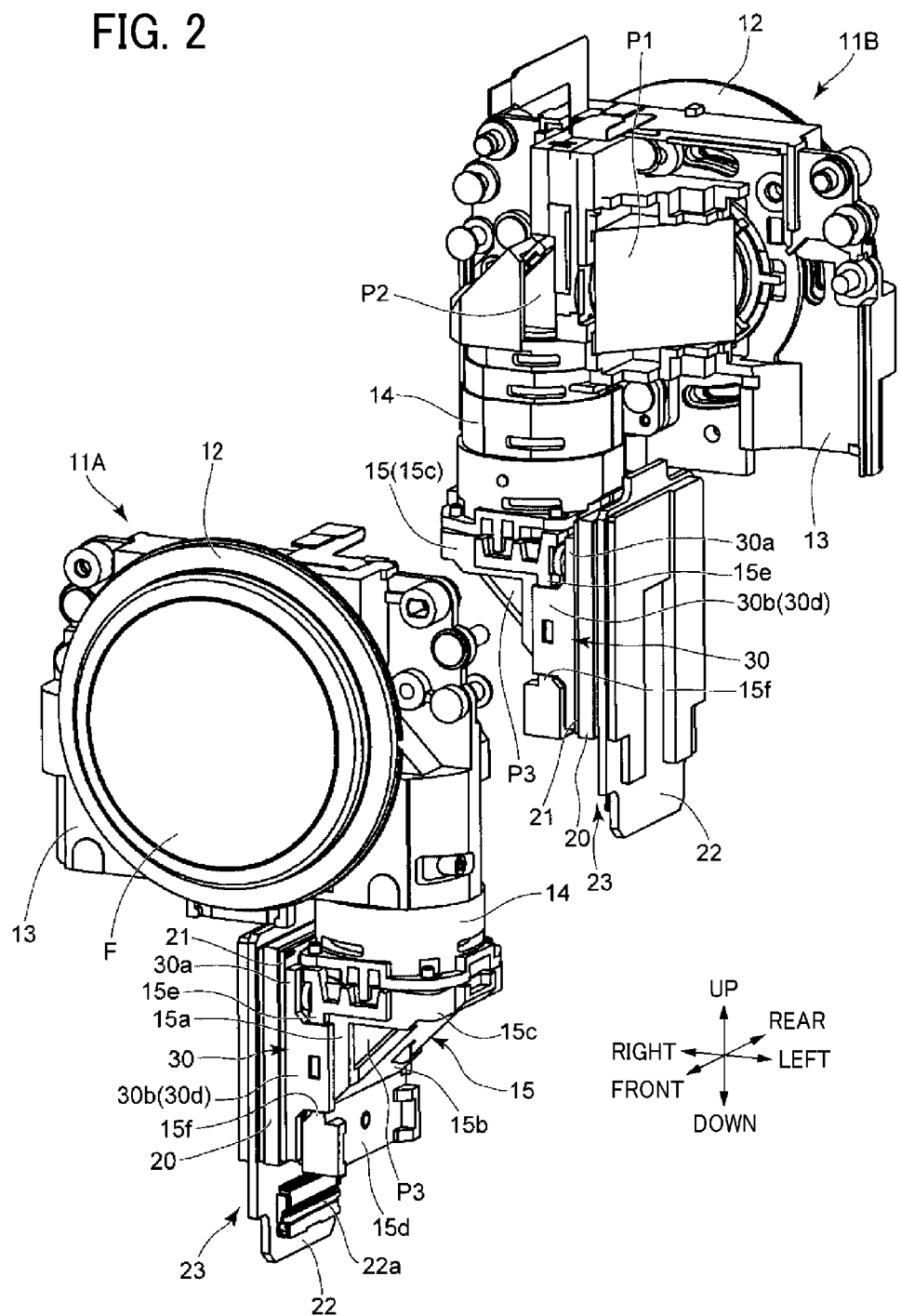
FIG. 2 is a perspective view illustrating a state in which two lens barrels constituting the imaging apparatus are divided from each other.

Now, referring to the drawings, an imaging apparatus according to an embodiment to which the present invention is applied will be described. An imaging apparatus 10 according to the present embodiment includes two lens barrels 11A and 11B (FIG. 2) that have an identical shape and that are symmetrically combined with each other. In the following description, directions of front, rear, up, down, left, and right are based on the directions indicated by the arrows illustrated in the drawings.

The individual lens barrels 11A and 11B each include, as optical elements constituting an imaging optical system, a front group F, a first prism P1, a second prism P2, a rear group (not illustrated), and a third prism P3 in order from an object side. The third prism P3 has an exit surface facing an image sensor 20.

The lens barrel 11A and the lens barrel 11B are combined with each other such that respective front groups F are directed opposite each other in the front-rear direction and such that the optical axes of the respective front groups F are coaxially aligned. The first prism P1 of the lens barrel 11A and the first prism P1 of the lens barrel 11B have respective angled surfaces that are adjacent to each other in a back-to-back manner. The first prism P1 of the lens barrel 11A reflects leftward a luminous flux that has entered through the front group F of the lens barrel 11A. The first prism P1 of the lens barrel 11B reflects rightward a luminous flux that has entered through the front group F of the lens barrel 11B. The second prism P2 of the lens barrel 11A and the second prism P2 of the lens barrel 11B reflect downward a luminous flux that has been reflected by the first prisms P1 of the lens barrel 11A and a luminous flux that has been reflected by the first prism P1 of the lens barrel 11B, respectively. The third prism P3 of the lens barrel 11A reflects rightward a luminous flux that has been reflected by the second prism P2 of the lens barrel 11A and that has passed through the rear group (not illustrated) of the lens barrel 11A. The third prism P3 of the lens barrel 11B reflects leftward a luminous flux that has been reflected by the second prism P2 of the lens barrel 11B and that has passed through the rear group (not illustrated) of the lens barrel 11B.

Figure 6:
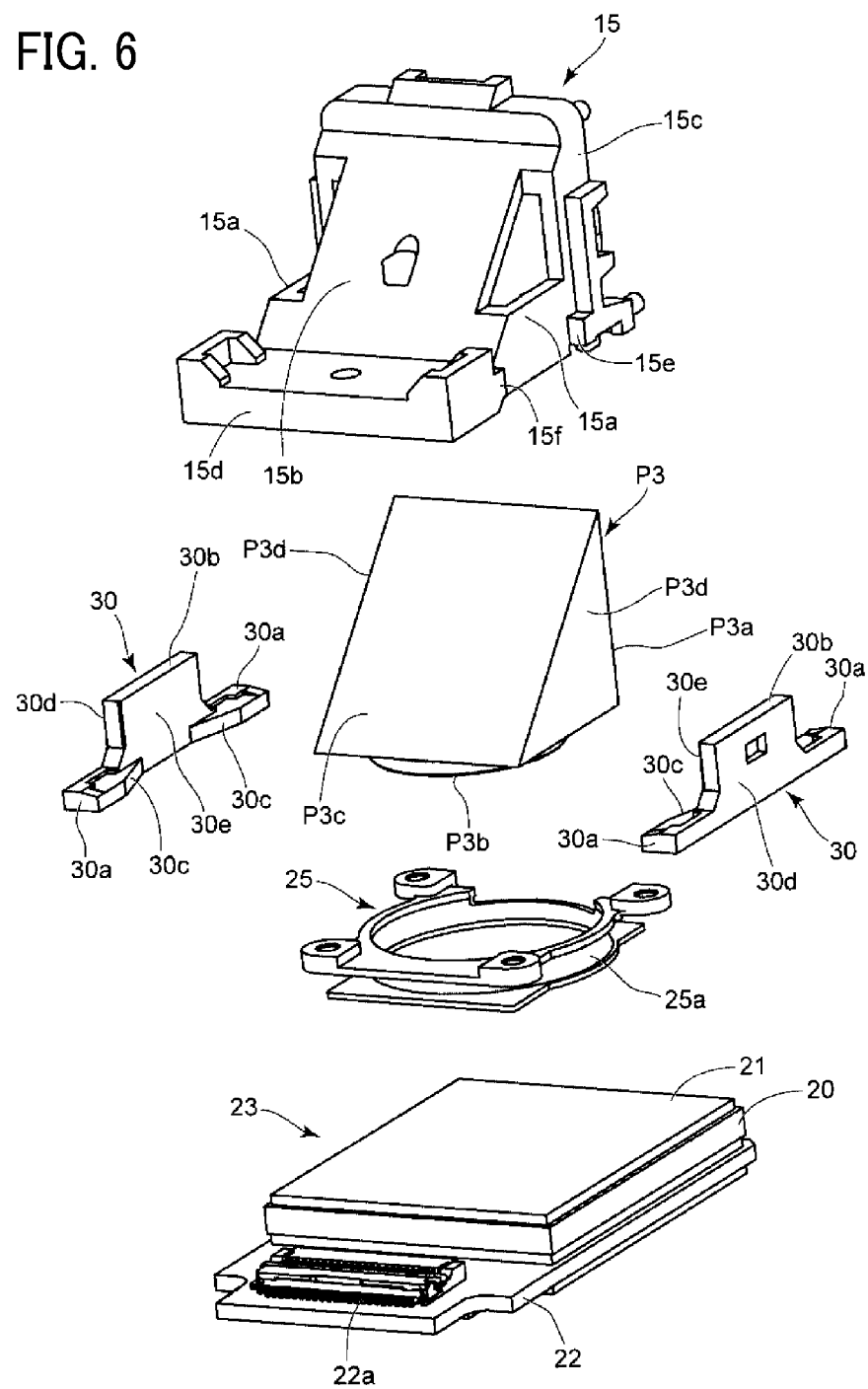
FIG. 6 is a perspective view illustrating a state in which the image sensor unit and the holding members are disassembled from the third prism frame.
Figure 7:
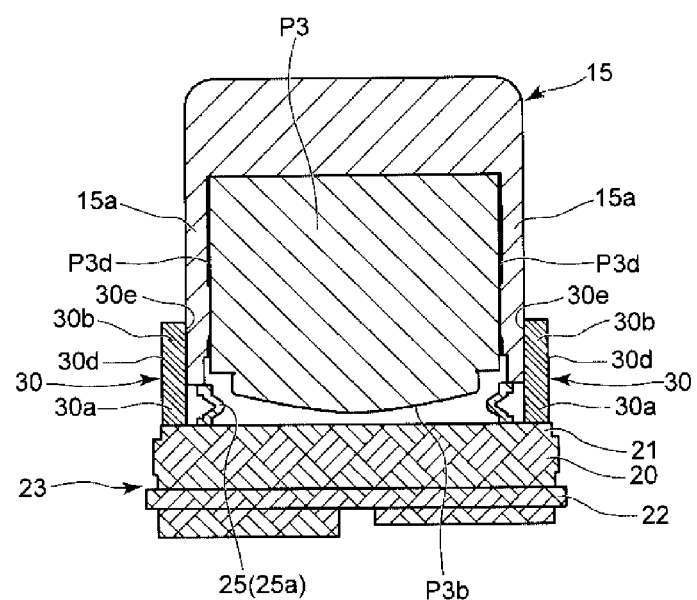
FIG. 7 is a sectional view of an image-sensor fixing structure.

As illustrated in FIG. 6 and FIG. 7, each third prism P3 has an entrance surface P3a facing the rear group, an exit surface P3b facing the image sensor 20, and an angled surface P3c between the entrance surface P3a and the exit surface P3b, the angled surface P3c forming a reflection surface. The exit surface P3b has a convex surface projecting toward the image sensor 20. The third prism P3 has, at side portions, a pair of side surfaces P3d that are substantially perpendicular to the entrance surface P3a and the angled surface P3c and that are parallel to each other.

Figure 4:
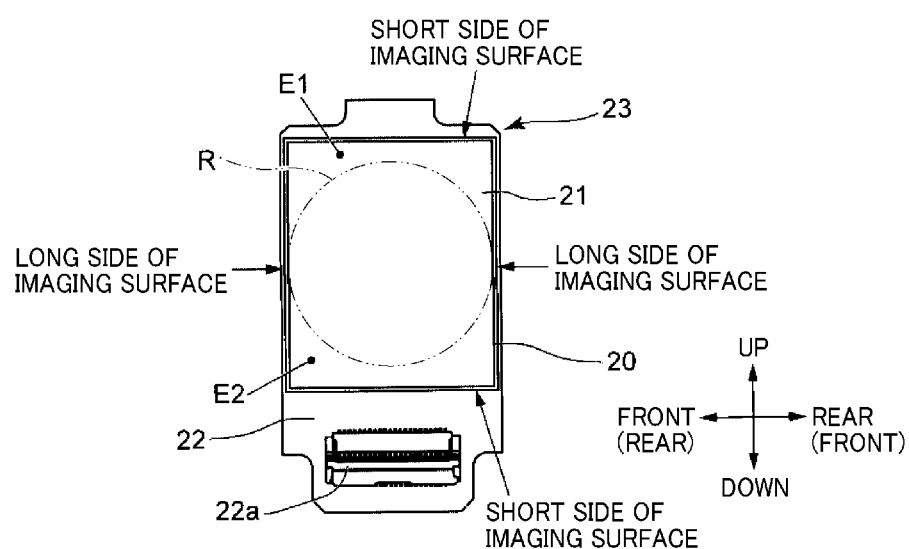
FIG. 4 is a view of an image sensor unit as viewed from an imaging surface.

The image sensor 20 of the lens barrel 11A has an imaging surface directed leftward. The image sensor 20 of the lens barrel 11B has an imaging surface directed rightward. As illustrated in FIG. 4 and FIG. 6, the imaging surface of each image sensor 20 has a rectangular shape, and a rectangular covering glass 21 covers the imaging surface. The idea of the imaging surface in the present invention includes a state in which the imaging surface is covered with the covering glass 21.

Each image sensor 20 includes a substrate 22 on a rear surface (a surface opposite to the imaging surface) of the image sensor 20. The substrate 22 includes a connector 22a. The imaging optical system forms an object image on the imaging surface of the image sensor 20. The object image is subjected to photoelectric conversion, and an image signal is thereby generated. The image signal is sent from the substrate 22 via the connector 22a to another substrate (not illustrated) on the imaging apparatus 10. A combination of the image sensor 20 and the substrate 22 is referred to as an image sensor unit 23. Respective substrates 22 of the image sensor unit 23 of the lens barrel 11A and the image sensor unit 23 of the lens barrel 11B have respective rear surfaces (surface on a side opposite to the side where the image sensor 20 is disposed) that are disposed back-to-back.

The imaging optical system of each of the lens barrels 11A and 11B has an angle of view wider than 180 degrees. The imaging optical system is a full-circle (circular) fisheye lens having an image circle R (FIG. 4) that fits within the imaging surface of the image sensor 20. That is, the imaging surface of the image sensor 20 has an effective region, which is used to form an image during imaging, inside the range of the image circle R. The imaging optical system is a spherical imaging system that combines two images formed on a respective one of the image sensors 20 of the lens barrels 11A and 11B to obtain an image within a solid angle of $4\pi$ steradians.

The imaging optical system of each of the lens barrels 11A and 11B uses a plurality of prisms (P1, P2, P3) to bend an optical path a plurality of times and is thus slim in the front-rear direction. Respective image sensor units 23 of the lens barrels 11A and 11B are adjacent to each other (in a back-to-back manner) in the left-right direction. The imaging surfaces of the image sensors 20 each have a short-side direction corresponding to the front-rear direction and a long-side direction corresponding to the up-down direction. Consequently, the total imaging system of the two lens barrels 11A and 11B is slim in the front-rear direction. It is thus possible to reduce parallax between the lens barrels 11A and 11B to obtain a high-quality spherical image.

Each of the lens barrels 11A and 11B includes, as body members holding the imaging optical system, a front-group frame 12 holding the front group F, a base frame 13 holding the first prism P1 and the second prism P2, a rear-group frame 14 holding the rear group, and a third prism frame 15 holding the third prism P3. Each of the front-group frame 12, the base frame 13, the rear-group frame 14, and the third prism frame 15 is a molded component made of plastic or the like. The front-group frame 12 and the rear-group frame 14 are fixed to the base frame 13. The third prism frame 15 is fixed to the rear-group frame 14. The image sensor unit 23 is fixed to the third prism frame 15.

Figure 5:
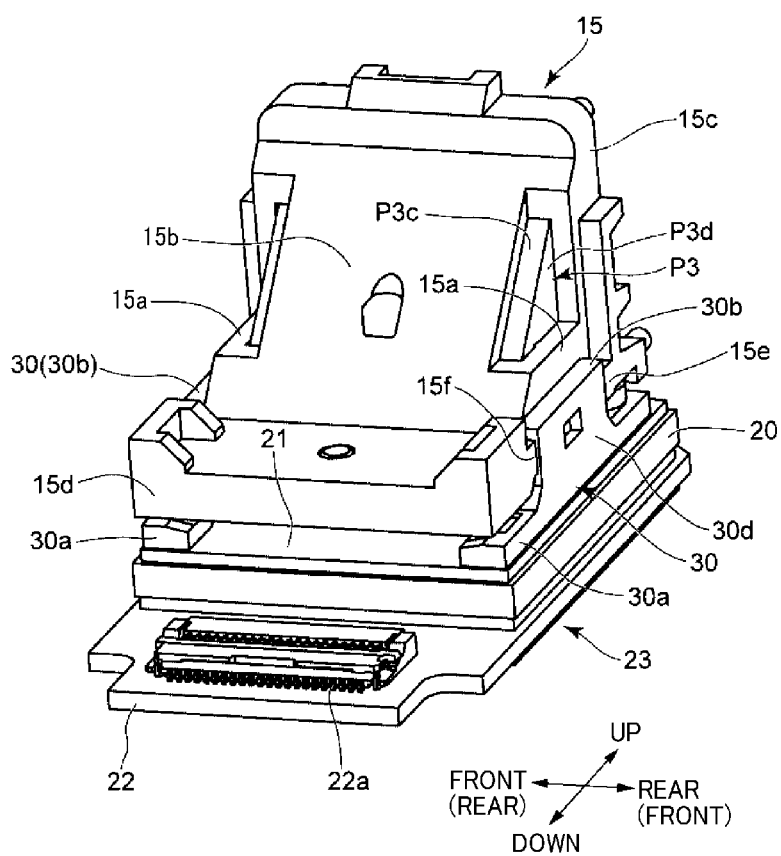
FIG. 5 is a perspective view illustrating a state in which the image sensor unit is assembled with a third prism frame via holding members.

Now, a fixing structure of the image sensor 20 in the lens barrels 11A and 11B will be described. As illustrated in FIG. 5 to FIG. 7, the third prism frame 15 includes a pair of sidewall portions 15a holding the pair of side surfaces P3d of the third prism P3 and an angled wall portion 15b holding the angled surface P3c. The third prism frame 15 includes, on the upper end side, a cylindrical entrance-side connection portion 15c opening upward. The entrance-side connection portion 15c is bonded to be fixed to a lower end portion of the rear-group frame 14. The third prism frame 15 includes, on the lower end side, a lower projecting portion 15d. The third prism frame 15 further includes a pair of side projecting portions 15e projecting sideward further than the pair of sidewall portions 15a and a pair of side projecting portions 15f projecting sideward from the lower projecting portion 15d. The side projecting portions 15e and the side projecting portions 15f are separated from and face each other in the up-down direction.

A sealing member 25 is inserted between the third prism frame 15 and the image sensor 20. The sealing member 25 is made of an elastically deformable material (for example, rubber) and includes an annular portion 25a surrounding the exit surface P3b of the third prism P3. The sealing member 25 is held in an elastically deformed state between the sidewall portions 15a of the third prism frame 15 and the covering glass 21 to form a dust-proof structure (refer to FIG. 7) between the third prism P3 and the image sensor 20, the dust-proof structure being shielded from outside space. The material constituting the sealing member 25 has light-blocking properties. The sealing member 25 surrounds the optical path extending from the third prism P3 to the image sensor 20, thereby suppressing external light from entering.

The image sensor unit 23 including the image sensor 20 is fixed to the third prism frame 15 via holding members 30. A pair of the holding members 30 are fixed to the pair of sidewall portions 15a of the third prism frame 15, and the pair of holding members 30 are fixed to the imaging surface (covering glass 21) of the image sensor 20.

As illustrated in FIG. 6, each of the holding members 30 includes an image-sensor fixing portion 30a extending along the long sides of the imaging surface of the image sensor 20 in the up-down direction; and a prism-frame fixing portion 30b projecting from a center portion of the image-sensor fixing portion 30a in the longitudinal direction. The image-sensor fixing portion 30a includes a tapered portion 30c that has a width greater, at two ends in the longitudinal direction, than the thickness of the prism-frame fixing portion 30b and that gradually reduces the width of the image-sensor fixing portion 30a toward the center in the longitudinal direction.

At one side portion of each of the holding members 30, the image-sensor fixing portion 30a and the prism-frame fixing portion 30b form a flat outside surface 30d with no unevenness. At another side portion of each of the holding members 30, the prism-frame fixing portion 30b forms a flat inside surface 30e while the image-sensor fixing portion 30a (including the tapered portion 30c) projects sideward with respect to the inside surface 30e. However, in a center region of each of the holding members 30 in the longitudinal direction, the image-sensor fixing portion 30a does not project from the inside surface 30e, that is, the thickness of the holding member 30 corresponds to the thickness of the prism-frame fixing portion 30b.

Respective inside surfaces 30e of the pair of holding members 30 face each other in a positional relationship symmetrical in the front-rear direction. The respective inside surfaces 30e of the pair of holding members 30 are in contact, from the sides, with the side surfaces of the pair of sidewall portions 15a of the third prism frame 15. The prism-frame fixing portions 30b are positioned between the side projecting portion 15e and the side projecting portion 15f to determine a rough position of each of the holding members 30 with respect to the third prism frame 15. Each of the holding members 30 is bonded to be fixed to the third prism frame 15.

As illustrated in FIG. 7, an interval between the outside surfaces 30d of the pair of holding members 30 attached to the third prism frame 15 is roughly equal to (strictly, the interval between the pair of outside surfaces 30d is slightly smaller than) the length of the covering glass 21 in the short-side direction of the imaging surface of the image sensor 20. Therefore, when the pair of holding members 30 are disposed to face the imaging surface of the image sensor 20, the image-sensor fixing portion 30a of each of the holding members 30 faces a peripheral portion of a long-side portion of the imaging surface of the image sensor 20. The portions at which the holding members 30 and the image sensor 20 (covering glass 21) face each other are bonded together to fix the image sensor unit 23 including the image sensor 20 to the third prism frame 15.

Specifically, as illustrated in FIG. 4, the imaging surface of the image sensor 20 includes, on two sides in the long-side direction (up-down direction), a first region E1 and a second region E2, which are outside the range of the image circle R of the imaging optical system. Each of the first region E1 and the second region E2 widens in the up-down direction toward the long sides (edge portions of the image sensor 20 in the front-rear direction) of the imaging surface. Respective image-sensor fixing portions 30a of the pair of the holding members 30 face the first region E1 and the second region E2 and bonded to the covering glass 21 in the vicinity of the four corners of the imaging surface, where the first region E1 and the second region E2 are widest in the up-down direction.

As a result of the holding members 30 being thus fixed to a peripheral region (the first region E1 and the second region E2) of the imaging surface of the image sensor 20, the pair of holding members 30 fit within the range of the width (the length in the short-side direction) of the imaging surface of the image sensor 20 in the front-rear direction (refer to FIG. 5 and FIG. 7). The pair of sidewall portions 15a, to which the pair of holding members 30 are fixed, of the third prism frame 15 also fit within the range of the width (the length in the short-side direction) of the imaging surface of the image sensor 20 in the front-rear direction. The individual holding members 30 also fit within the range of the length (the length in the long-side direction) of the imaging surface of the image sensor 20 in the up-down direction (refer to FIG. 5). Accordingly, the fixing structure fixing the image sensor 20 to the third prism frame 15 via the pair of holding members 30 does not increase the size of the imaging apparatus 10 in a direction along the imaging surface of the image sensor 20, which greatly contributes to a size reduction in the entire imaging apparatus 10.

Figure 3:
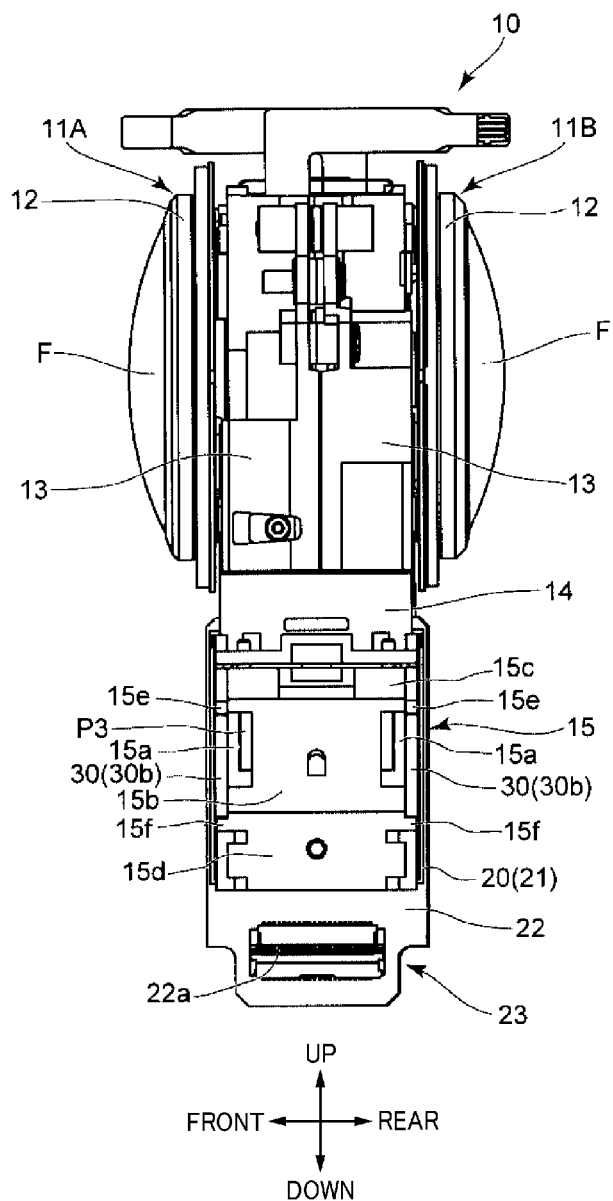
FIG. 3 is a side view of the imaging apparatus.

In particular, as illustrated in FIG. 3, the imaging apparatus 10 according to the present embodiment, other than a portion of the front group F projecting in the front-rear direction, is compact in the front-rear direction so that substantially the entirety of the imaging apparatus 10 fits within the range of a width that is substantially equivalent to the short sides of the imaging surface of the image sensor 20. If employing a fixing structure fixing the third prism frame 15 to an outer circumferential portion instead of to the imaging surface of the image sensor 20, the lens barrels 11A and 11B are not possible to fit within the width in the front-rear direction illustrated in FIG. 3. In contrast, employing the fixing structure according to the present embodiment suppresses the holding members 30 from projecting in the front-rear direction with respect to the image sensor 20, which enables the image sensor 20 to be fixed while saving substantial space.

Regions in which the holding members 30 are fixed to the image sensor 20 are outside the image circle R, illustrated in FIG. 4, of the imaging optical system. Due to the tapered portion 30c reducing the width of the center portion of the image-sensor fixing portion 30a in the longitudinal direction, the holding members 30 do not obstruct an effective imaging region defined by the image circle R. Accordingly, a size reduction in the image-sensor fixing structure is achieved without degrading optical performance.

The holding members 30 interposed between the image sensor 20 and the third prism frame 15 enables the image sensor 20 to be fixed with a small amount of an adhesive. When the amount of the adhesive is small, contraction during curing of the adhesive and deformation due to heat are suppressed. As a result, it is possible to accurately hold the image sensor 20. The use of the pair of holding members 30 to hold two edge portions of the image sensor 20 enables the image sensor 20 to be held stably with the effective imaging region of the image sensor 20 not being obstructed by the holding members 30.

The holding members 30 are bonded to be fixed to the smooth covering glass 21. Thus, an adhesive capable of adhering to the covering glass 21 without flowing down until curing is completed with a certain degree of high viscosity is preferably used for fixing of the holding members 30.

The image-sensor fixing portion 30a of each of the holding members 30 according to the present embodiment has a flat surface (a bonded surface of the holding member 30) facing the covering glass 21. In a manner different from the above, the bonded surface of each of the holding members 30 may have an adhesive-gathering concave portion or the like to improve workability in bonding and to increase bonding strength.

Figure 8:
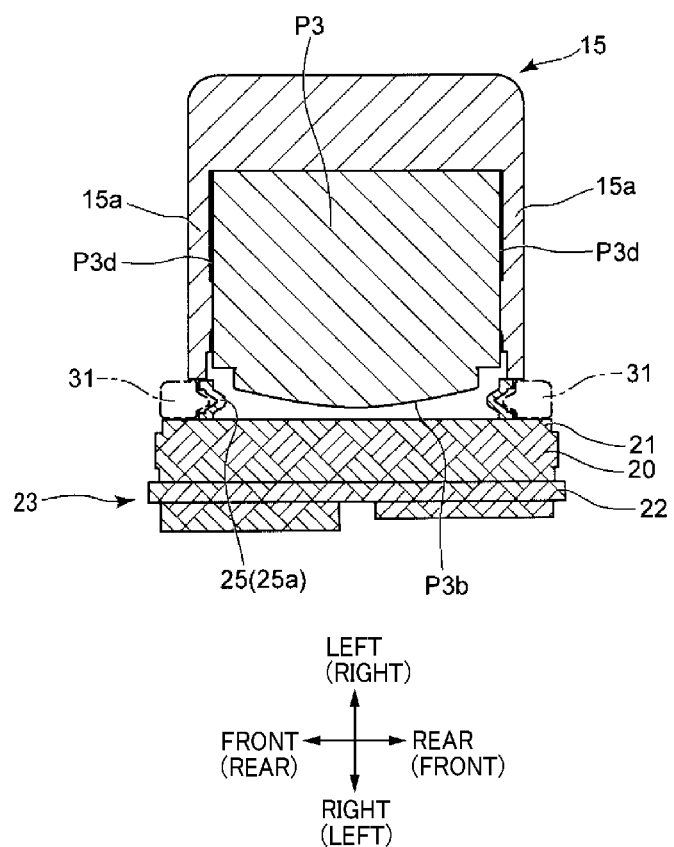
FIG. 8 is a sectional view illustrating a first modification of the image-sensor fixing structure.

In a first modification illustrated in FIG. 8, a gap between the third prism frame 15 (sidewall portions 15a) and the image sensor 20 (21) is filled with an adhesive 31 to fix the image sensor 20 without using the holding members 30 of the previously described embodiment. The sealing member 25 shields, from outside space and light, a space between the third prism P3 and the image sensor 20. The sealing member 25 also functions as a protective wall suppressing the adhesive 31 from flowing into the image circle R (FIG. 4) of the imaging optical system. Thus, the regions bonded with the adhesive 31 are included in the peripheral region of the image sensor 20, the peripheral region not influencing optical performance, and it is thus possible to obtain the same effect as the effect obtained in the previously described embodiment.

Figure 9:
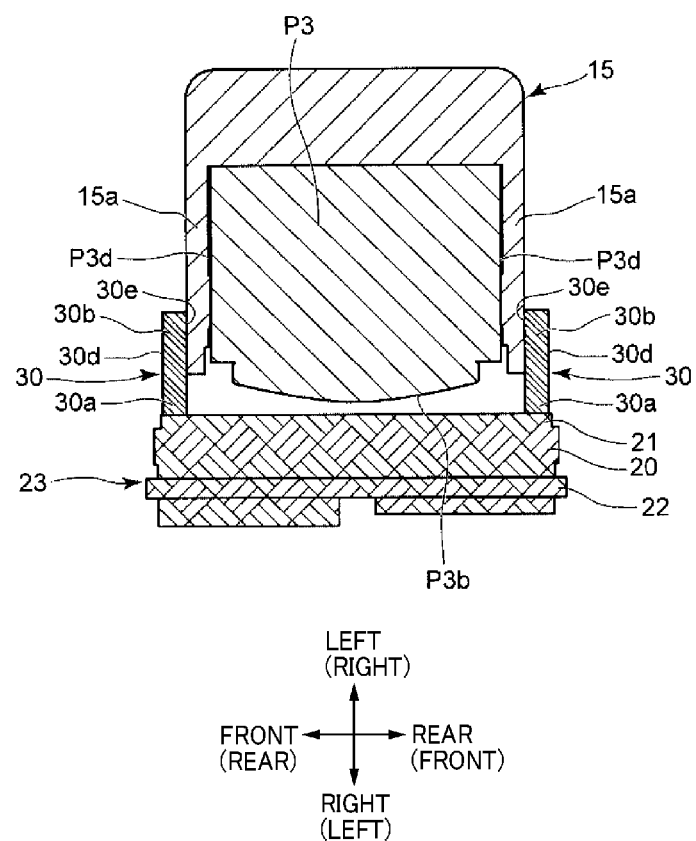
FIG. 9 is a sectional view illustrating a second modification of the image-sensor fixing structure.

A second modification illustrated in FIG. 9 corresponds to the previously described embodiment in which the sealing member 25 is omitted. When sufficient dust-proof performance and light-blocking performance around the image sensor 20 are obtainable due to the third prism frame 15 and the holding members 30, the sealing member 25 may be thus omitted.

Figure 10:
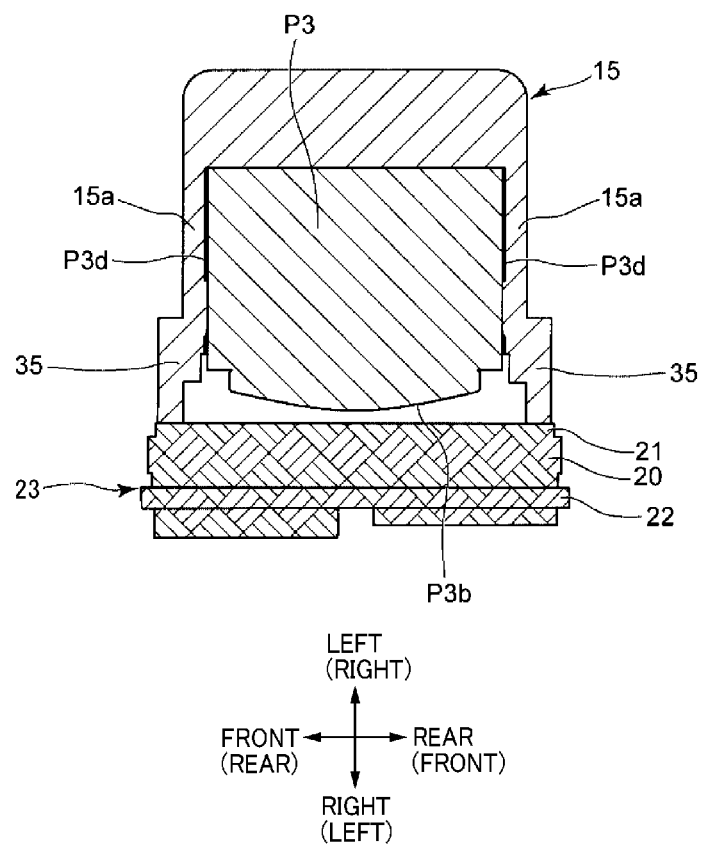
FIG. 10 is a sectional view illustrating a third modification of the image-sensor fixing structure.

In a third modification illustrated in FIG. 10, portions corresponding to the holding members 30 according to the previously described embodiment are integral with the third prism frame 15. In other words, the third prism frame 15 is directly, instead of via a separate member, fixed to the imaging surface of the image sensor 20. The third prism frame 15 in FIG. 10 includes a holding leg 35 at a leading end of each of the pair of sidewall portions 15a. Each of the holding legs 35 is in contact with and bonded to be fixed to the imaging surface (covering glass 21) of the image sensor 20 in the first region E1 and the second region E2 (FIG. 4), which do not overlap the image circle R (FIG. 4) of the imaging optical system. In the configuration in FIG. 10, the image sensor unit 23 is directly fixed to the third prism frame 15, which reduces the number of components and enables the fixing structure to be simplified.

As indicated in the above modifications, the shape and type of the body members fixed to the imaging surface of the image sensor 20 are selectable from various forms.

The present invention is not limited to the aforementioned embodiments and can be modified or improved within the spirit of the intention. For example, the aforementioned embodiments are applied to a structure for fixing the image sensor 20 to the third prism frame 15 holding the third prism P3; however, an object to which the image sensor is fixed may be a body member other than the third prism frame 15.

The third prism frame 15 according to the aforementioned embodiment includes the pair of sidewall portions 15a extending along the pair of side surfaces P3d of the third prism P3, and the pair of sidewall portions 15a each has a shape extending along the long sides of the imaging surface of the image sensor 20. Therefore, the pair of holding members 30 fixed to the pair of sidewall portions 15a and the pair of holding legs 35 integral with the pair of sidewall portions 15a are fixed to the imaging surface of the image sensor 20.

In a manner different from the above, when the optical elements disposed directly before the image sensor 20 are lenses (group) each having a cylindrical outer surface, the body members fixed to the imaging surface of the image sensor 20 may be cylindrical members holding the lenses (group). In this case, each of the cylindrical body members preferably includes, at an end portion, a portion that is fixable to the first region E1 and the second region E2 (FIG. 4) of the imaging surface of the image sensor 20.

The present invention is useful, in particular, in an imaging apparatus in which an imaging optical system is a full-circle fisheye lens, as is in the aforementioned embodiment. With full-circle fisheye lenses, a comparatively wide region, including four corners, of the imaging surface of the image sensor serves as the peripheral region (refer to FIG. 4), which is not used to receive light of an image formed by the imaging optical system. Thus, the body members are easily fixed to the imaging surface without degrading optical performance. The present invention is, however, also applicable to an imaging apparatus including an imaging optical system other than a full-circle fisheye lens provided that a peripheral region to which the body members are fixable is included in the imaging surface.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority pursuant to 35 U.S.C. § 119(a) to Japanese Patent Application No. 2018-052386, filed on Mar. 20, 2018, in the Japan Patent Office, the entire disclosure of which is hereby incorporated by reference herein.

REFERENCE SIGNS LIST

10 Imaging apparatus
11A Lens barrel
11B Lens barrel
12 Front-group frame
13 Base frame
14 Rear-group frame
15 Third prism frame (body member)
15a Sidewall portion
15b Angled wall portion
15c Entrance-side connection portion
15d Lower projecting portion
15e Side projecting portion
15f Side projecting portion
20 Image sensor
21 Covering glass
22 Substrate
22a Connector
23 Image sensor unit
25 Sealing member
25a Annular portion
30 Holding member (Body member)
30a Image-sensor fixing portion
30b Prism-frame fixing portion
30c Tapered portion
30d Outside surface
30e Inside surface
31 Adhesive
35 Holding leg
E1 First region
E2 Second region
F Front group
P1 First prism
P2 Second prism
P3 Third prism
P3a Entrance surface P3b Exit surface
P3c Angled surface
P3d Side surface
R Image circle

The invention claimed is:

1. An image-sensor fixing structure comprising:
an imaging optical system; and
an image sensor configured to receive light of an image formed by the imaging optical system,
wherein the image sensor has an imaging surface including:
an effective region, in which light of an image formed by the imaging optical system is received, and
a peripheral region outside the effective region, and
wherein a body frame holding the imaging optical system is fixed to the peripheral region through a pair of holders, and
each of the pair of holders includes an image-sensor fixing portion extending along a long side of the imaging surface of the image sensor, the image-sensor fixing portion including a tapered portion that has a width greater at two ends than at a center portion in a longitudinal direction, and the image sensor fixing portion faces a part of the peripheral region and is bonded to the image sensor at the part of peripheral region.

2. The image-sensor fixing structure according to claim 1, wherein the imaging optical system includes a full-circle fisheye lens having an image circle fitting within the imaging surface, and
wherein the effective region is inside the image circle and the peripheral region is outside the image circle.

3. The image-sensor fixing structure according to claim 2, wherein the imaging surface has a substantially rectangular shape, and
wherein the imaging surface has four corners included in the peripheral region.

4. The image-sensor fixing structure according to claim 1, wherein the body frame includes a prism frame holding a prism constituting the imaging optical system,
wherein the prism frame includes a pair of sidewall portions holding two side surfaces of the prism, and
wherein the pair of sidewall portions or the pair of holders fixed to the pair of sidewall portions is fixed to the peripheral region of the imaging surface.

5. The image-sensor fixing structure according to claim 2, wherein the body frame includes a prism frame holding a prism constituting the imaging optical system,
wherein the prism frame includes a pair of sidewall portions holding two side surfaces of the prism, and
wherein the pair of sidewall portions or the pair of holders fixed to the pair of sidewall portions is fixed to the peripheral region of the imaging surface.

6. The image-sensor fixing structure according to claim 3, wherein the body frame includes a prism frame holding a prism constituting the imaging optical system,
wherein the prism frame includes a pair of sidewall portions holding two side surfaces of the prism, and
wherein the pair of sidewall portions or the pair of holders fixed to the pair of sidewall portions is fixed to the peripheral region of the imaging surface.

7. The image-sensor fixing structure according to claim 1, wherein each of the pair of holders further includes a prism-frame fixing portion projecting from the center portion of the image-sensor fixing portion in the longitudinal direction, and the image sensor fixing portion includes the tapered portion that has the width greater, at the two ends in the longitudinal direction, than a thickness of the prism-frame fixing portion and that gradually reduces the width of the image-sensor fixing portion toward the center in the longitudinal direction.

* * * * *